(12) United States Patent
Jain

(10) Patent No.: US 12,741,416 B2
(45) Date of Patent: Sep. 22, 2026

(54) HIGH TEMPERATURE EXTRUDER FOR A 3D PRINTER

(71) Applicant: 3RDAXIS PTY LTD, Darlington (AU)

(72) Inventor: Ashish Jain, Darlington (AU)

(73) Assignee: 3RDAXIS PTY LTD, Darlington (AU)

( * ) Notice: Subject to any disclaimer, the term of this patent is extended or adjusted under 35 U.S.C. 154(b) by 9 days.

(21) Appl. No.: 18/721,694

(22) PCT Filed: Dec. 19, 2022

(86) PCT No.: PCT/AU2022/051537
§ 371 (c)(1),
(2) Date: Jun. 19, 2024

(87) PCT Pub. No.: WO2023/115117
PCT Pub. Date: Jun. 29, 2023

(65) Prior Publication Data

US 2025/0058515 A1 Feb. 20, 2025

(30) Foreign Application Priority Data

Dec. 20, 2021 (AU) ................................ 2021290207

(51) Int. Cl.
*B29C 64/209* (2017.01)
*B29C 48/02* (2019.01)
(Continued)

(52) U.S. Cl.
CPC ............ *B29C 64/209* (2017.08); *B29C 48/02* (2019.02); *B29C 48/27* (2019.02);
(Continued)

(58) Field of Classification Search
None
See application file for complete search history.

(56) References Cited

U.S. PATENT DOCUMENTS 12,600,082 B2 * 4/2026 Gasperini ............. B29C 64/118
2007/0148279 A1 6/2007 Gellert
(Continued)

FOREIGN PATENT DOCUMENTS

CN 105408095 A 3/2016
CN 106553341 B 10/2018
(Continued)

OTHER PUBLICATIONS

International Search Report; Mar. 31, 2023; WO2023/0115117.

*Primary Examiner* — Emmanuel S Luk
(74) *Attorney, Agent, or Firm* — Sand, Sebolt & Wernow Co., LPA

(57) ABSTRACT

An extruder for 3D FDM printing with a highly thermally conductive ceramic nozzle that allows for very high temperature operation suitable for printing metals and high melting point plastics, whilst also being hard wearing to cope with abrasive materials. A heating element is printed onto the nozzle to allow for high temperatures in a compact space. A skirt attached to the nozzle provides heating to already deposited material to assist in bonding metal as it is deposited, as well as fume extraction. A non-conductive ceramic down tube thermally isolates the nozzle from the material feed mechanism. All major parts are themselves 3D printed.

8 Claims, 7 Drawing Sheets

(51) Int. Cl.

| | |
|---|---|
| ***B29C 48/27*** | (2019.01) |
| ***B29C 48/30*** | (2019.01) |
| ***B29C 48/86*** | (2019.01) |
| ***B29C 64/295*** | (2017.01) |
| ***B29C 64/371*** | (2017.01) |
| ***B33Y 30/00*** | (2015.01) |
| ***B33Y 80/00*** | (2015.01) |

(52) U.S. Cl.

CPC ........ *B29C 48/3003* (2019.02); *B29C 48/865* (2019.02); *B29C 64/295* (2017.08); *B29C 64/371* (2017.08); *B33Y 30/00* (2014.12); *B33Y 80/00* (2014.12); *B29K 2909/02* (2013.01)

(56) References Cited

U.S. PATENT DOCUMENTS

| | | | | |
|---|---|---|---|---|
| 2017/0252851 | A1 | 9/2017 | Fulop | |
| 2017/0274454 | A1* | 9/2017 | Feng | B22F 12/70 |
| 2017/0291841 | A1* | 10/2017 | Inamura | B33Y 30/00 |
| 2017/0348721 | A1 | 12/2017 | Kalsi | |
| 2018/0311727 | A1* | 11/2018 | Willmann | B23K 35/0261 |
| 2018/0345573 | A1* | 12/2018 | Zinniel | B21C 33/02 |
| 2019/0118258 | A1 | 4/2019 | Sachs | |
| 2019/0201978 | A1* | 7/2019 | Oftedal | B22F 12/10 |
| 2020/0316866 | A1* | 10/2020 | Jain | B33Y 40/10 |
| 2021/0060676 | A1 | 3/2021 | Diepstraten | |
| 2021/0086443 | A1* | 3/2021 | Cote | B29C 64/321 |
| 2021/0221056 | A1* | 7/2021 | Gjovik | B29C 64/118 |
| 2021/0245438 | A1 | 8/2021 | Xiao | |
| 2022/0324166 | A1* | 10/2022 | Lorusso | B29C 48/2886 |
| 2023/0398741 | A1* | 12/2023 | Voss | B29C 64/209 |
| 2024/0253306 | A1* | 8/2024 | Glasschröder | B29C 64/227 |
| 2026/0021634 | A1* | 1/2026 | Vachon | B29C 64/295 |

FOREIGN PATENT DOCUMENTS

| | | | |
|---|---|---|---|
| CN | 110355364 | A | 10/2019 |
| CN | 110815816 | A | 2/2020 |
| WO | 2019014612 | A1 | 1/2019 |
| WO | 2020255069 | A1 | 12/2020 |

* cited by examiner

HIGH TEMPERATURE EXTRUDER FOR A 3D PRINTER

FIELD OF THE INVENTION

The present invention relates to 3D printing, in particular an extruder for an FDM (Fused Deposition Modelling) printer capable of operating at high temperatures.

BACKGROUND TO THE INVENTION 3D printing has become widespread in industrial, research and development, and increasingly in hobbyist applications with printers developed for a wide variety of materials including food stuffs, plastics, ceramics and metals.

The development of FDM (Fused Deposition Modelling) 3D printers has provided a low-cost printing option but has been limited in the materials that can be handled. Entry level printers are limited in the temperature that they can operate at, typically ~300° C. This makes them suitable for plastics such as PLA with a melting point of 180° C. and ABS with a melting point of 270° C. To date extruders for FDM printers have not been able to reach the temperatures required to handle common metals such as aluminium with a melting point of 660° C. Typical problems include isolating the high temperatures, oxidation of printing material, handling fumes and unwanted changes in nozzle material properties at high temperatures.

As well as temperature limitations FDM printers often suffer excessive wear in their nozzles which are typically made from brass, particularly when printing plastics with abrasive filler materials such as carbon fibre filaments. Improved nozzles have been made from harder materials such as tungsten or even rubies, but such nozzles are themselves difficult to manufacture and together with their exotic materials makes them impractically expensive for most applications.

To 3D print metals different types of printers have been developed, most commonly variations on laser sintering. Whilst effective such printers are expensive to both build and to operate, putting them out of reach of many potential users. Other technologies such as kinetic fusion are in development, but still are not expected to produce an easily affordable metal printing solution.

The object of this invention is to provide an extruder capable to alleviate the above problems, or at least provide the public with a useful alternative.

SUMMARY OF THE INVENTION

In a first aspect the invention provides an extruder for 3D printing comprising a ceramic nozzle 3D printed from a highly thermally conductive ceramic.

Preferably the nozzle includes an integrally formed nozzle heating element, and the nozzle heating element is formed by screen printing a metallic slurry onto the nozzle, covering the nozzle heating element with a ceramic material and then sintering the nozzle.

In preference, the nozzle is covered by a low thermally conductive ceramic sleeve.

The nozzle may comprise a skirt including a plurality of skirt heating elements on the underside of the skirt, and preferably each of the plurality of skirt heating elements is in a planar arrangement on the underside of the skirt, and each of the plurality of skirt heating elements is located in a separate circular sector of the skirt.

In preference the skirt heating elements are individually controllable.

The extruder may further comprise a ceramic down tube attached to the nozzle, wherein the down tube is formed from a low thermally conductive ceramic.

Preferably the extruder comprises a low thermally conductive cover surrounding the nozzle formed as a series of alternating walls and voids, and preferably the low thermally conductive cover comprises passageways in fluid communication with the underside of the skirt and means of extracting fumes through a first subset of the passageways, and means for introducing inert gas into a second subset of the passageways.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DRAWING COMPONENTS

Figure 1:
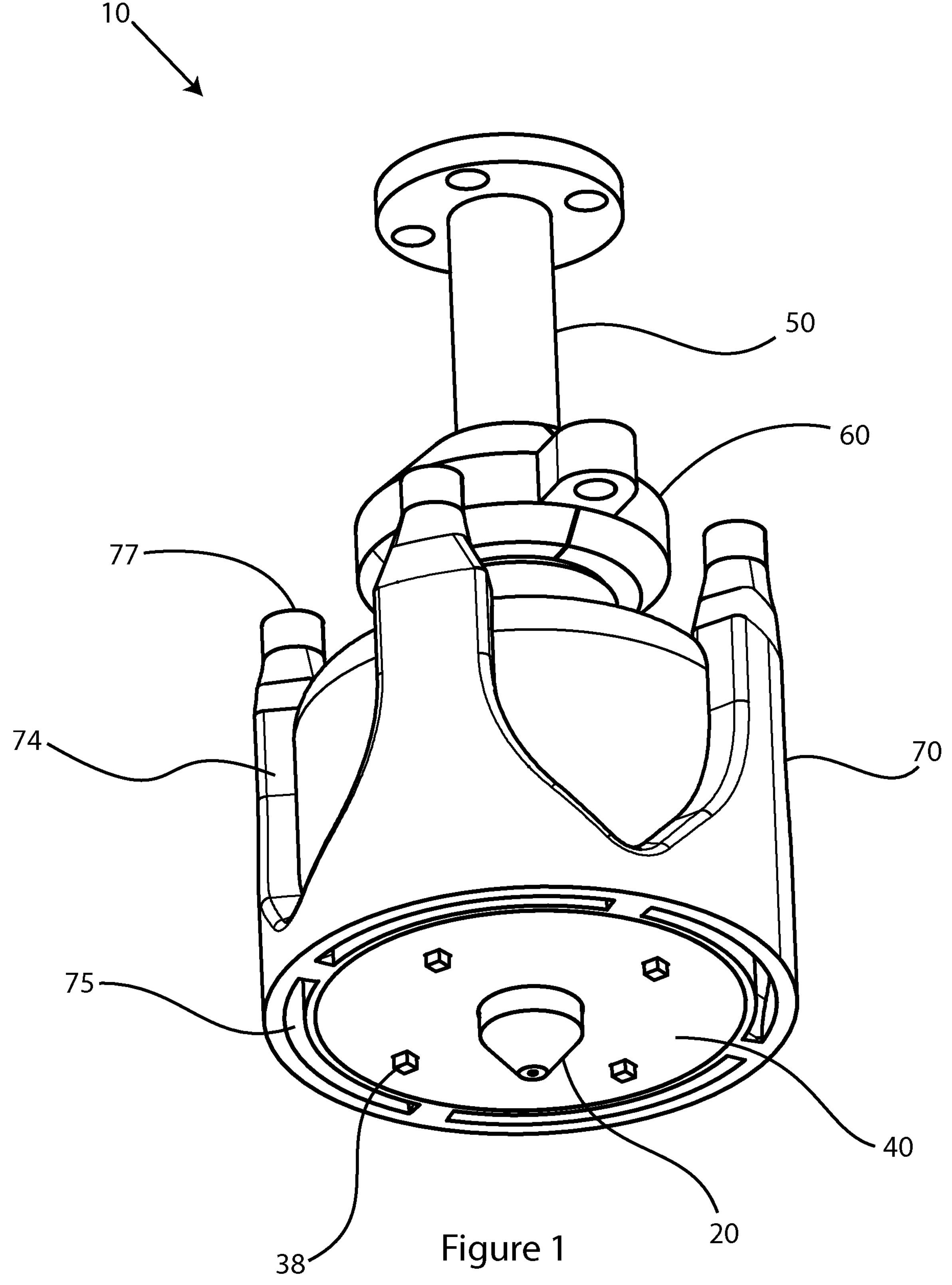
FIG. 1 is a perspective view from below of an extruder according to a preferred embodiment of the invention.
Figure 2:
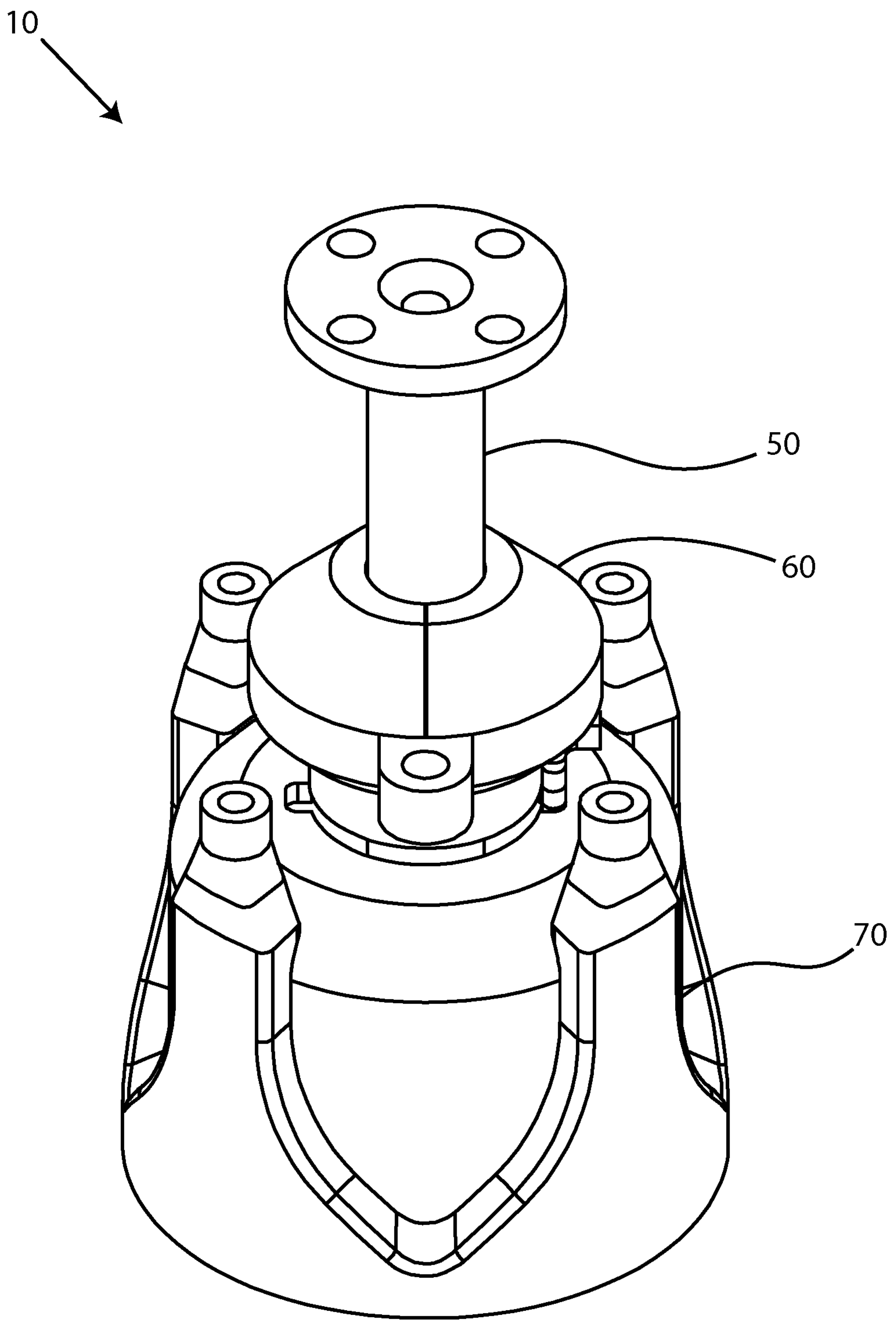
FIG. 2 is a above perspective view of the extruder.

The drawings include the following integers.

10 extruder
20 nozzle
21 tube
22 conical end
24 nozzle heater element
25 reservoir
26 tip aperture
28 feed end
30 nozzle skirt
31 circular sector of skirt
32 skirt heater elements
33 heater connection
34 heater return track
35 heater return connection
38 thermocouples
40 skirt shield
50 down tube
52 tube
54 flange
56 conical end
60 clamp
70 cover
71 body

72 walls
73 voids
74 fume/inert gas tower
75 bottom opening
76 passage
77 top opening
78 skirt recess
80 nozzle shield

DETAILED DESCRIPTION OF THE INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration. Connecting wires have been omitted from the drawings for representational convenience.

The present provides an extruder for FDM printing formed primarily from ceramic components. A highly thermally conductive ceramic nozzle allows for very high temperature operation suitable for printing metals and high melting point plastics, whilst also being hard wearing to cope with abrasive materials. High temperature and reliable operation is achieved with a heating element printed onto the nozzle. A skirt attached to the nozzle provides heating to already deposited material to assist in bonding metal as it is deposited, as well as fume extraction and/or the introduction of an inert atmosphere. The heating is zoned to limit the heating to material that is about to be printed upon. A non-conductive ceramic down tube thermally isolates the nozzle from the material feed mechanism.

An extruder 10 according to a preferred embodiment of the invention is shown in FIGS. 1 to 4 in perspective from below, in perspective from above, in cross-section and in an exploded view. The extruder 10 comprises five major components: nozzle 20 for melting and depositing material; nozzle skirt 30 for pre-heating already deposited material; down tube 50 for thermally isolating the nozzle from the rest of the printer; clamp 60 for securing the down tube to the nozzle; and insulating cover 70 to surround the nozzle and extract fumes and/or introduce an inert atmosphere to prevent oxidation of the printed material. All of the major components can be 3D printed.

Figure 4:
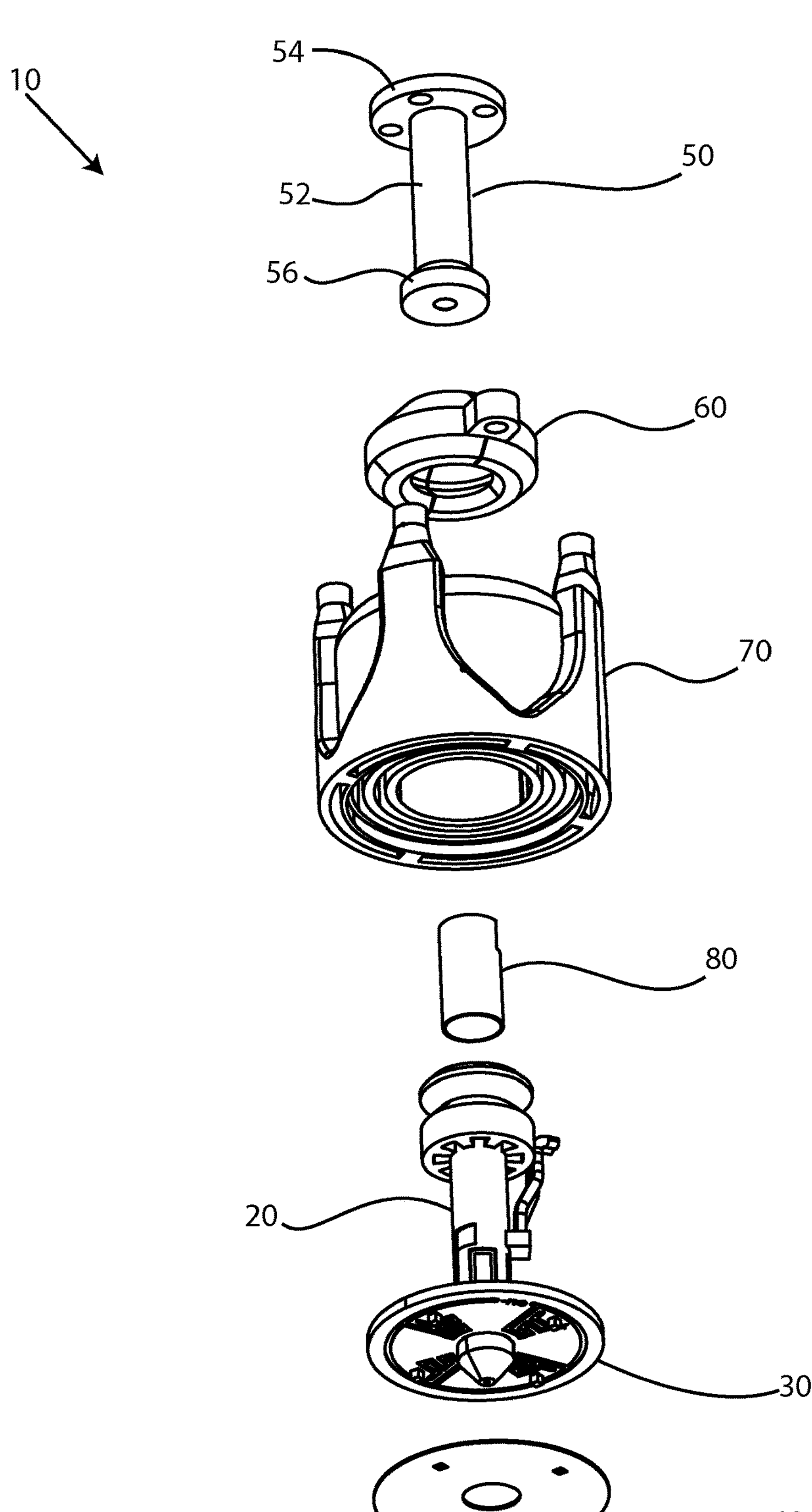
FIG. 4 is an exploded view of the extruder.
Figure 5A:
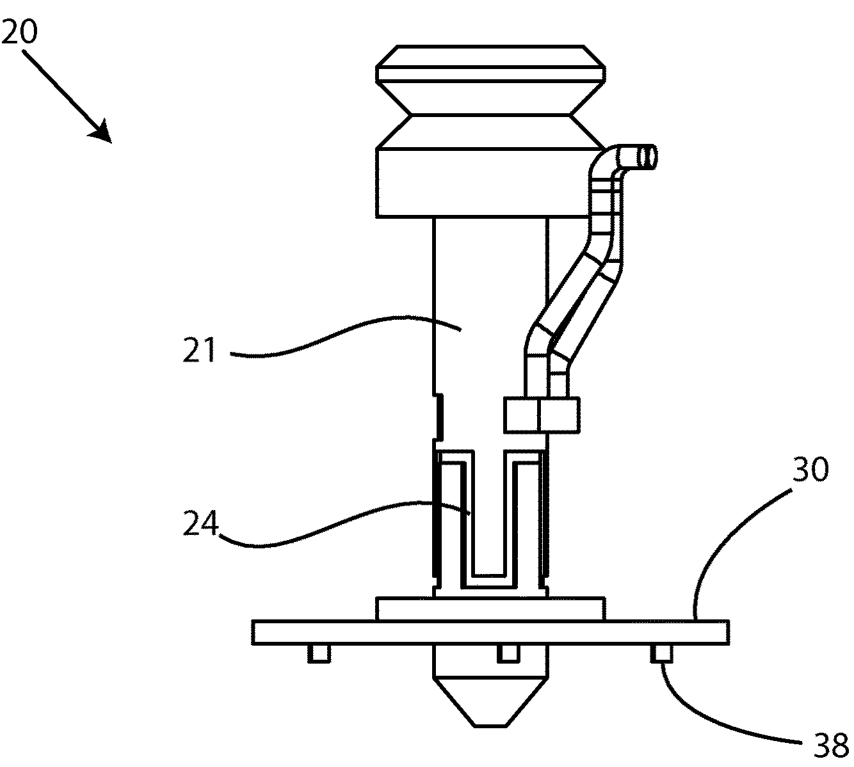
FIG. 5A shows a side view of the nozzle of the extruder, whilst
Figure 5B:
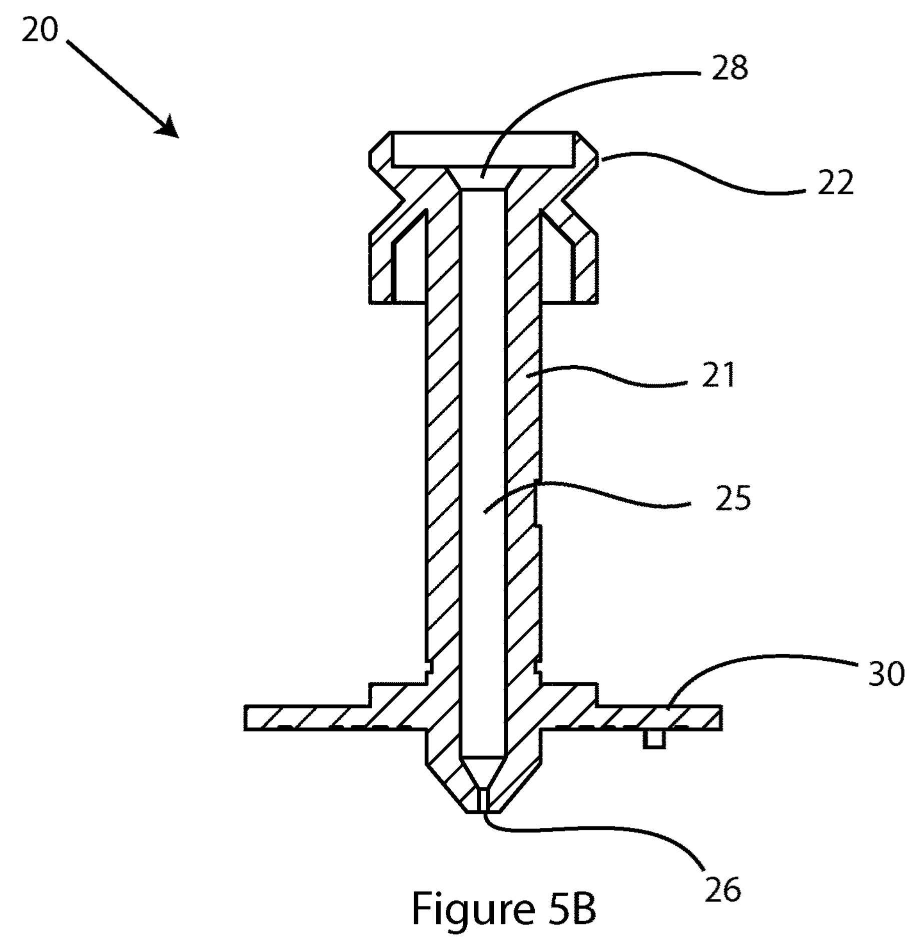
FIG. 5 shows a cross sectional view.

The heart of the extruder is the nozzle 20 which is shown in isolation in FIG. 5A from the side and in cross section in FIG. 5B. The nozzle is made from a highly thermally conductive ceramic material such as Aluminium Nitride or Silicon Carbide and is preferably formed itself by 3D printing. Being made of ceramic allows the nozzle to operate at high temperatures suitable for melting metals without reacting with the metal or atmosphere and remaining mechanically stable, as well as providing low friction for use with abrasive materials. The nozzle is in the form of a tube 21 with a feed end 28 for accepting a material to be melted; internal reservoir 25 to hold the melted material; and tip aperture 26 at a bottom end for applying liquid material. The feed end is shaped as an inverted cone to allow it to be clamped to the down tube 50 by clamp 60. A heater element 24 is formed, preferably screen printed, on the tube 21 from Tungsten or Molybdenum. An integrally formed heating element is preferred as it allows for high temperature, compact size and optimised heat transfer to the nozzle. A shield 80 (seen in FIG. 4) of Aluminium Nitride or Silicon Carbide is formed, preferably printed, over the heater element 24 to prevent oxidation.

Figure 6:
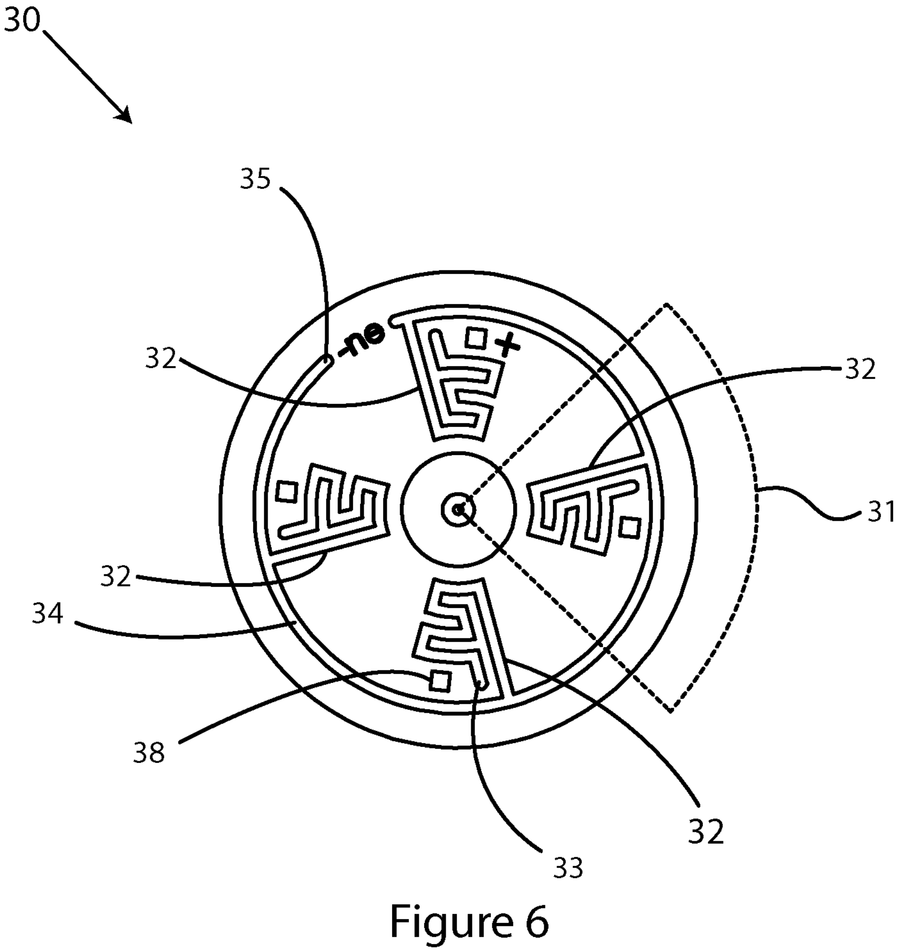
FIG. 6 shows the underside of the skirt of the nozzle including heating elements.

The nozzle 20 includes an integral skirt 30 for localised pre-heating of the print bed, or already deposited material that is to be printed upon. The skirt is made from a highly thermally conductive ceramic material such as Aluminium Nitride or Silicon Carbide and is preferably formed itself by 3D printing. A bottom view of the skirt 30 is shown in FIG. 6 and can be seen to comprise four printed heater elements 32. The heater elements 32 are located in separate circular sectors 31 (one of four shown) and have individual connections 34 that allow them to be controlled independently. A common return path 34 leads to return connection 35. The positioning within separate circular sectors 31 and independent control of the heater elements provides localised pre-heating to where material is to be deposited, thus enhancing adhesion and preventing unwanted re-melting of deposited material where material is not being deposited. In operation, the heating element corresponding to the direction of travel of the extruder would be turned on and the remaining elements left unpowered. The skirt 30 includes an array of thermistors 38 for temperature monitoring. The heater elements are formed, preferably printed, on the skirt 30 from Tungsten or Molybdenum. A shield 40, again preferably printed from a highly thermally conductive ceramic material such as Aluminium Nitride or Silicon Carbide, fits over the skirt 30 to prevent oxidation of the heater elements. The embodiment shown includes 4 heating elements in 4 sectors. More heating elements and sectors can be used to increase resolution of the heating.

Figure 3:
FIG. 3 is a cross-sectional view of the extruder.
Figure 3:
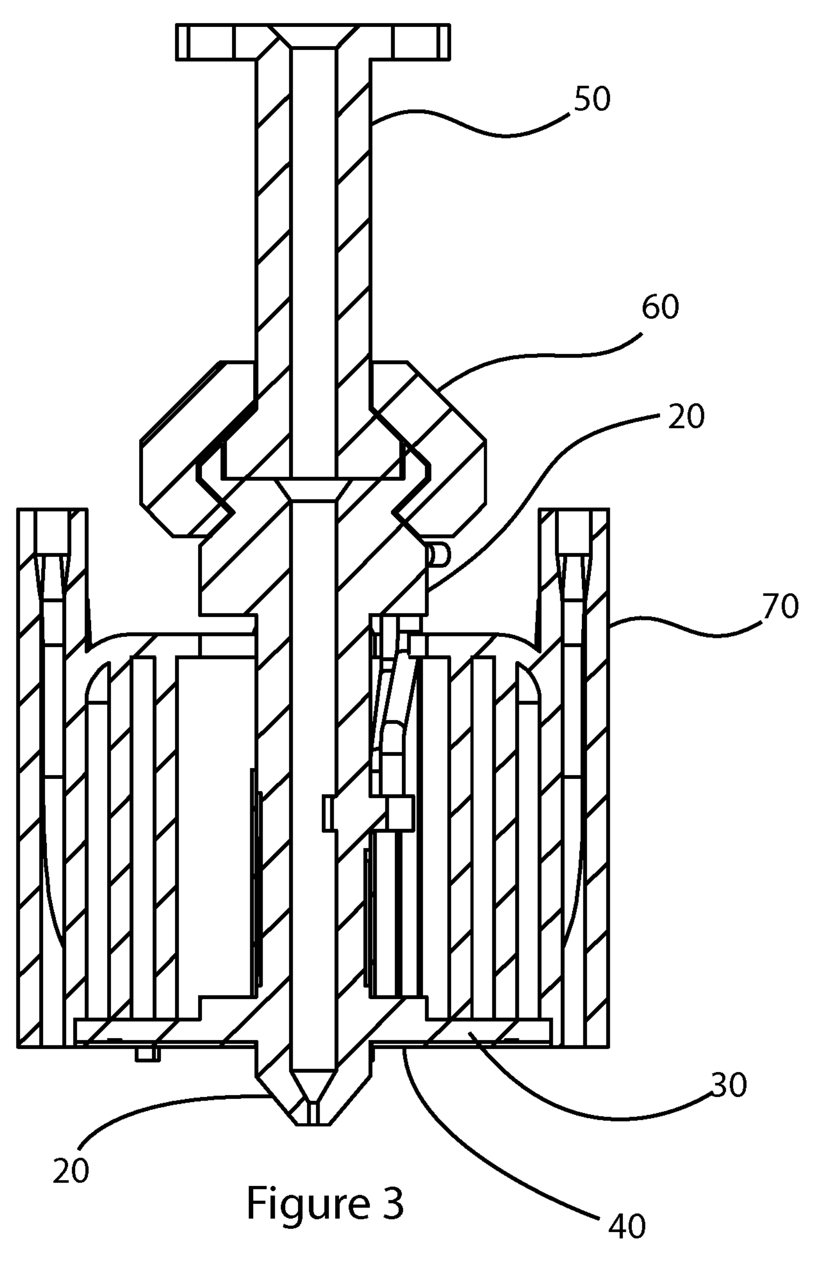

Down tube 50 is best seen in FIG. 3 and FIG. 4, and comprises tube 52 with a flanged end 54 for attaching to the rest of the printer and conical end 56 to facilitate clamping to the nozzle 20 using clamp 60. Preferably the clamp 60 holds the down tube 50 slightly away from the nozzle 20 to provide a very low thermally conductive airgap between the two. The down tube is made from a low thermally conductive ceramic such as Zirconia to inhibit thermal transfer from the nozzle 20 and is preferably formed by 3D printing.

Figure 7A:
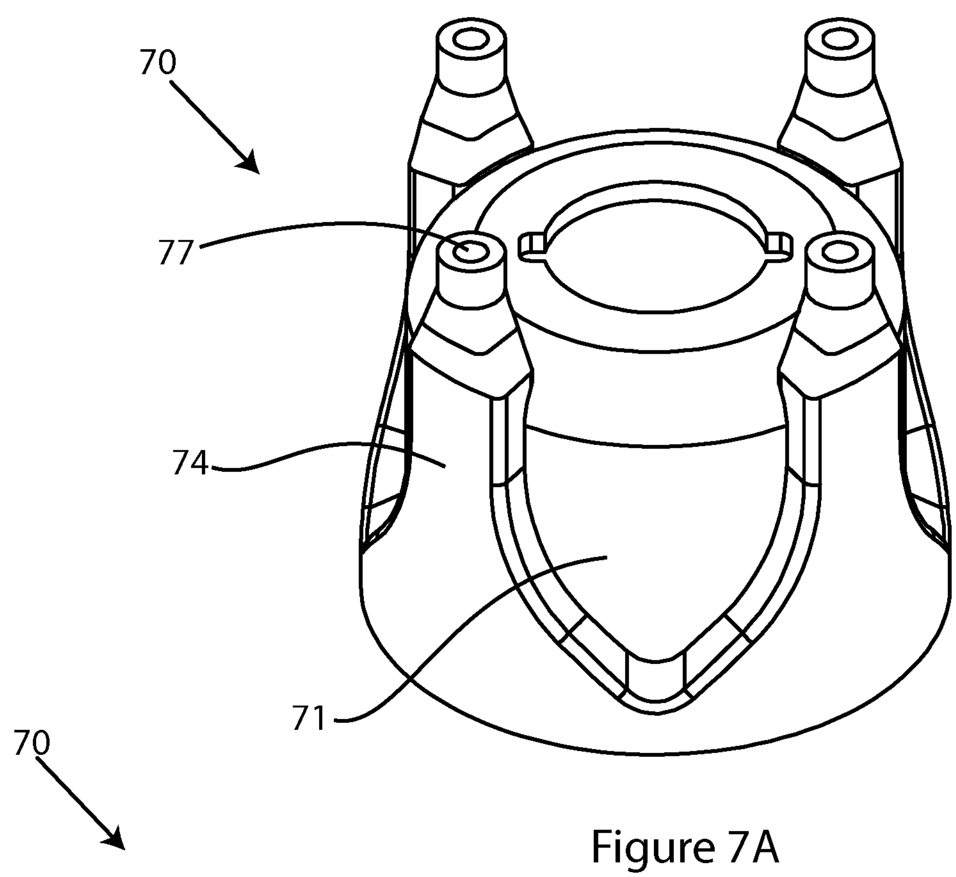
FIG. 7A shows s perspective view of the cover of the extruder, whilst
Figure 7B:
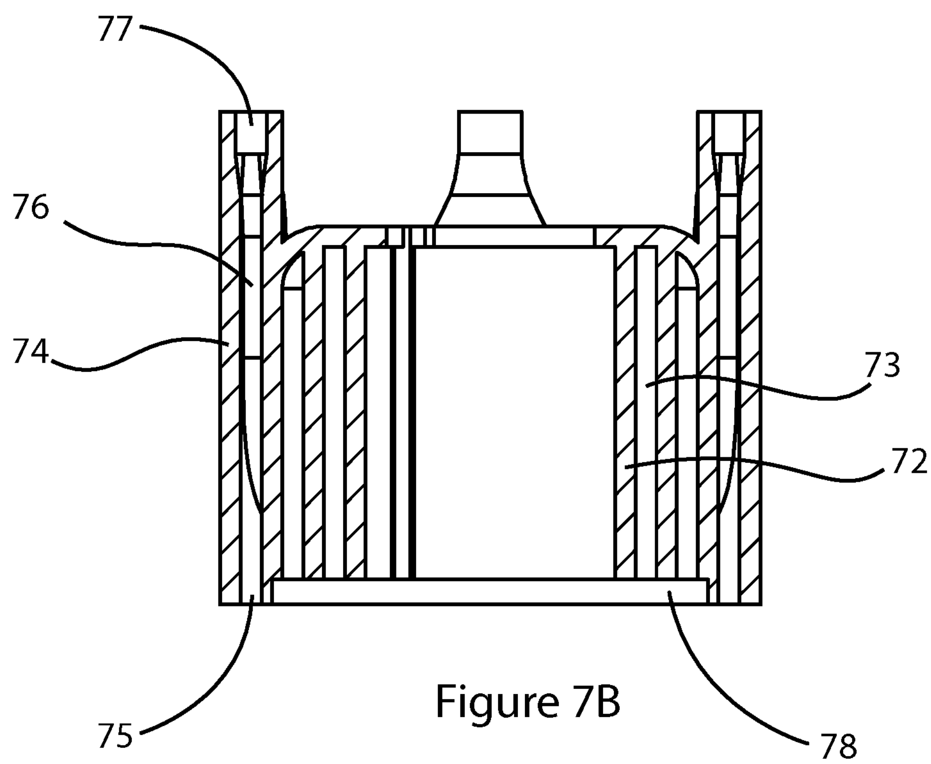
FIG. 7B shows a cross sectional view.

FIG. 7 shows the cover 70 which provides three functions: thermal isolation of the nozzle 20; fume extraction; and supplying an inert atmosphere around the nozzle tip. The cover 70 is preferably made from a low thermally conductive ceramic such as Zirconia and formed by 3D printing to provide a body 71 with alternating walls 72 and voids 73 to provide thermal isolation of the nozzle which sits within the body. Four towers 74 on the outside of the body provide a passageway 75 with bottom opening 76 on the periphery of the nozzle skirt 30 to allow fumes to be extracted and expelled via the top opening 77. Tubes for extracting the fumes (not shown) are connected to the top openings. The towers may instead be used to introduce an inert gas such as nitrogen under the skirt 30. Preferably two diagonally opposed towers are used to introduce an inert gas and the remaining two towers are simultaneously used to extract fumes. The cover includes a recess 78 for accommodating the skirt 30 and shield 40 of the extruder.

The major components are 3D printed from ceramics, either a low conductive ceramic such as Aluminium Nitride or a high conductive ceramic such as Zirconia. Advantageously the nozzle has an integrally formed heating element which is screen printed onto the nozzle using a Tungsten (or the like) slurry, covered in an Alumina (or other highly conductive ceramic) and then sintered.

The above disclosure has described an improved extruder for FDM printing that is capable of high temperature operation to print metals, and low friction to handle abrasive material. Having the major components formed by 3D printing of ceramics allows for the complex physical configuration, and in particular allows for integration of a nozzle heating element to optimise thermal management Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. An extruder for 3D printing comprising a ceramic nozzle, wherein the ceramic nozzle has a skirt, and a plurality of skirt heating elements is provided on an underside of the skirt, wherein each of the plurality of skirt heating elements is in a planar arrangement on the underside of the skirt, and each of the plurality of skirt heating elements is located in a separate circular sector of the skirt.

2. The extruder as in claim 1, further comprising a nozzle heating element integrally formed with the ceramic nozzle.

3. The extruder as in claim 2, wherein the nozzle heating element comprises:

- a metallic slurry screen printed onto the ceramic nozzle; and
- a ceramic material covering the metallic slurry, wherein the ceramic material is subsequently sintered.

4. The extruder as in claim 1, further comprising a low thermally conductive ceramic sleeve covering the ceramic nozzle.

5. The extruder as in claim 1, wherein each of the plurality of skirt heating elements is individually controllable.

6. The extruder as in claim 1, further comprising a ceramic down tube attached to the ceramic nozzle, wherein the down tube is formed from a low thermally conductive ceramic.

7. The extruder as in claim 1, further comprising a low thermally conductive cover surrounding the ceramic nozzle, wherein the low thermally conductive cover is formed as a series of alternating walls and voids.

8. The extruder as in claim 7, wherein the low thermally conductive cover comprises passageways in fluid communication with the underside of the skirt and means of extracting fumes through a first subset of the passageways, and means for introducing inert gas into a second subset of the passageways.

* * * * *